United States Patent
Fletcher

[11] 3,720,320
[45] March 13, 1973

[54] APPARATUS FOR HANDLING SEWAGE
[76] Inventor: Robert I. Fletcher, 620 Highwood Avenue, Greencastle, Ind. 46135
[22] Filed: July 13, 1971
[21] Appl. No.: 162,181

[52] U.S. Cl. ..................210/199, 210/15, 210/210, 261/83
[51] Int. Cl. ........................B01f 9/02, C02c 1/04
[58] Field of Search......210/14, 15, 17, 49, 150, 198, 210/199, 209, 210, 218, 219; 261/83

[56] References Cited

UNITED STATES PATENTS

| 3,442,495 | 5/1969 | Schreiber | 210/17 X |
| --- | --- | --- | --- |
| 3,335,081 | 8/1967 | El-Naggar | 210/15 |
| 439,588 | 10/1890 | Devonshire | 210/150 |
| 3,389,798 | 6/1968 | Hartmann et al. | 210/17 X |
| 1,123,011 | 12/1914 | Ripley | 210/199 X |

Primary Examiner—Reuben Friedman
Assistant Examiner—Thomas G. Wyse
Attorney—Merriam, Marshall, Shapiro, Klose, Mann, Erwin, Jr., Shulman, O'Toole, Gerstein, Murray, Egan and Scarpelli

[57] ABSTRACT

A multi-pass, horizontal-rotating, continuous feed digester provides an effective, efficient aerobic digestion process for handling sewage which reduces pollution and promotes improved ecology.

11 Claims, 2 Drawing Figures

PATENTED MAR 13 1973

INVENTOR
Robert I. Fletcher
BY Merriam, Marshall, Shapiro & Klose
ATTORNEYS

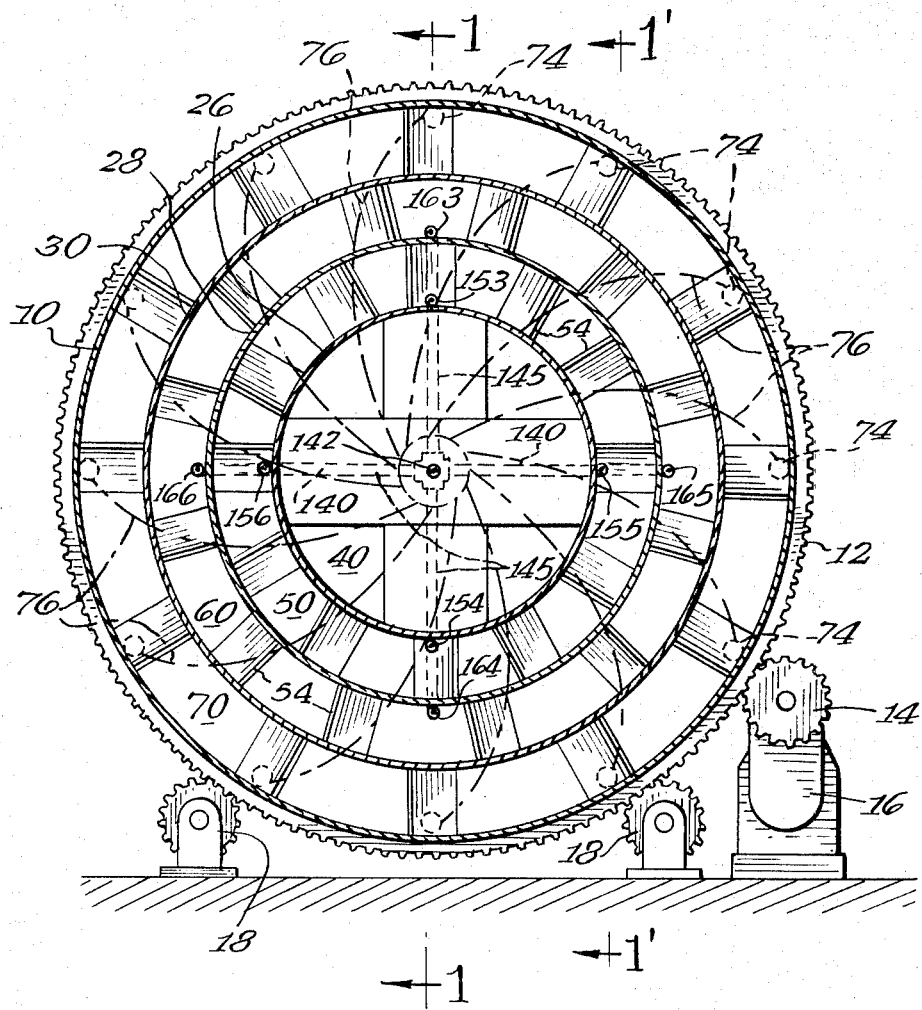

APPARATUS FOR HANDLING SEWAGE

The present invention relates to an apparatus for handling sewage, more particularly the present invention relates to a horizontal-rotating, multi-pass, continuous-feed digester which is suitable for digesting sewage in general, but which is particularly useful in carrying out aerobic digesting processes.

The digestion of sewage has been typically carried out in open tanks, wherein the process is difficult to control. Large tanks are difficult to aerate uniformly, somewhat difficult to control temperature wise, and difficult to separate the input and the output, from the main reacting body. The prior art process many times is not efficient and requires long holding times, as a result of which, the throughput is very low.

In most prior art sewage treatment plants, heavy sludge, which comprises less than 0.2 percent of water borne sewage, is removed from sedimentation tanks, and is transferred to sludge digesting tanks where relatively slow anaerobic decomposition continues. The sludge is usually held in such digestion tanks for several weeks. The sludge is finally digested into a dark viscous fluid in which theoretically little or no further biological action can occur. The sludge is then removed from the tank and deposited on sludge drying beds or may be dewatered in large heated drums, pulverized, and sold as fertilizers or incinerated. The heat generated in such processes kills the enteric pathogens.

The present invention provides a compact continuous digestion device which may be carefully regulated and controlled in order to produce a highly efficient aerobic digestion process, thereby reducing the average residence time for the sewage being treated. Broadly the present invention provides apparatus in which aerobic digestion of various types of waste can be efficiently conducted, the result of which is a sewage stabilization system which will reduce pollution and promote improved ecological conditions.

The process of the present invention contemplates an aerobic digestion process which is known to be more efficient than corresponding anaerobic processes. Sewage is collected in surge tanks and if necessary given conventional pre-treatments such as screening or grinding.

The raw sewage is then fed to the digester where it is oxygenated or aerated to the point where maximum biological metabolism is achieved and the aeration is continued as the materials flow into the subsequent portions of the multipass digester. The invention contemplates temperature, pH, and oxygen level sensors throughout the digester, whereby additions of chemicals, gases, heat, or removal of heat can be applied to maintain optimum digestion conditions.

The apparatus of the present invention is basically a horizontal, rotating, continuous-feed, multipass digester which is made up of a large horizontal cylinder which is fitted with drive means to rotate the cylinder about its horizontal axis. On each end of the cylinder there are end plates, which may be removable for maintenance or repair purposes. One end piece is fitted to feed raw sewage and to recover the stabilized water and non-digestable components. Means are provided whereby oxygen, air or other gases may be introduced under pressure, either continuously or at intervals, at selected points in the digester. Means are provided whereby the apparatus may be heated or cooled as desired. The gas introduction system provides a means for cleaning the apparatus of the present invention as it may become necessary.

Within the digester are several (preferably an odd number) of concentric cylinders or tapered cylinder members which run approximately the length of the main horizontal cylinder. The inner cylinders define a central cylindrical opening and several annular openings surrounding the inner cylinder. One end of the central cylindrical opening is in fluid connection with the innermost annular opening and each annular opening is connected to the adjacent annular openings, at alternating ends, so that the raw sewage can be fed into one end of the central cylindrical opening where it will flow the length of the central cylindrical opening (approximately the length of the digester). The feed will then move radially outward into the innermost annular opening and flow the length thereof, where it will again move outwardly to the adjacent annular opening. This flow system prevails from cylinder to cylinder. The entire digestion is thus carried out in a compact space which can be carefully regulated as to temperature, movement, gas content and the like. Thus the apparatus of the present invention provides means to carry out a highly efficient digestion of sewage. This system is particularly useful in carrying out aerobic digestion with air, air enriched with oxygen, or pure oxygen, since the gas input can be carefully controlled.

A better understanding will be had of the present invention by reference to the drawings in which:

FIG. 1 is a interrupted side elevational view of the digester of the present invention showing two partial sections wherein one portion of the section is taken at line 1—1 of FIG. 2, and the other portion of the section is taken at line 1'—1' of FIG. 2, and FIG. 2 is an end view, taken in section at point 2—2 of FIG. 1, but which also shows the vortex blades in phantom.

In the drawings, the horizontal cylinder is shown generally at 10. Cylinder 10 is supported by support rings 20, the number of which will be determined by the length of the cylinder 10 and by duplex drive gears 12 which are driven by drive gear 14, which is in turn driven by electrical motor 16. Support gears 18 support the weight of cylinder 10. Corresponding support wheels, not shown, are positioned beneath support ring 20 in order to provide cylinder 10 with a rotational ability. The number of support wheels and support rings used is dependent upon the length of cylinder 10.

End pieces 22 and 24 provide a fluid seal at the ends of cylinder 10. End pieces 22 and 24 may be removable in order to provide access to the interior of the digester for maintenance or adjustment. Disposed within said cylinder 10 are a plurality of tapered cylinder devices shown as 26, 28 and 30. These tapered cylinder devices, which are actually truncated cones and not perfect cylinders, as is described below, have end pieces 32 and 34. The tapered cylinder devices 26, 28, and 30 with the end plates 32 and 34 define a central cylindrical opening and a plurality of annular openings 50, 60, and 70, which are concentrically disposed about said central cylindrical opening 40. The means by which tapered cylinder devices 26, 28 and 30 are joined to end plates 32 and 34 is not critical, but it is preferred that the intersection be rounded, such as by the use of filets, in order to provide a smooth streamlined path for liquid flow.

The central cylindrical opening 40 is in fluid communication, at one end (the right end as shown in FIG. 1), with annular opening 50. The fluid communication may be accomplished by a series of openings 42 about the circumference of one end of cylinder 26. Preferably the fluid communication is designed to eliminate any dead spots from the fluid flow pattern.

Similarly, annular opening 50 is in fluid communication, at the opposite end (the left end as shown in FIG. 1), with annular opening 60. The fluid communication opening may conveniently take the form of a series of openings 52 which are disposed about the circumference of cylinder 28. At the opposite end (the right end as shown in FIG. 1), annular openings 60 is in fluid communication with annular opening 70. Again preferably the fluid communication takes the form of a plurality of openings about the circumference of one end of tapered cylinder member 30.

Annular opening 70 is in fluid communication at both ends with end chambers 80 and 82. The fluid communication between annular opening 70 and end chamber 82 may be conveniently accomplished by the openings 72 in end plate 32. The fluid communication between annular opening 70 and end chamber 82 may be conveniently accomplished by opening 74 in end plate 34. End chamber 82 is equipped with vortex discharge blades 76 which are generally arcuate shaped, and fill the width of end chamber 82. The vortex discharge blades 76 (which are shown in phantom in FIG. 2) run from the discharge plenum 84, outwardly to a point in proximity of cylinder 10. When the apparatus of the present invention is being used with materials which contain heavy particulate matter such as sand, it is desirable to extend the vortex discharge blades 76 to the point where they intersect cylinder 10, and form a fluid-type seal therewith. Such an arrangement will cause any sand or other particulate matter located at the bottom of end chamber 82 to be swept out discharge plenum 84 as cylinder 10 is rotated.

The feed and discharge apparatus is shown generally at the left end of cylinder 10. The feed apparatus comprises raw sewage feed pipe 90 which leads into feed pipe 92 which has a slip fitting 85 to feed pipe 94 which is affixed to end plate 34. The slip fitting 85 is packed with appropriate stuffing to prevent leakage. Raw sewage from pipe 90 moves through pipe 92 and pipe 94 into central cylindrical opening 40. The discharge from end chamber 82 is fed into a discharge plenum 84 where it proceeds past slip fitting 85 into discharge box 86. From discharge box 86 it proceeds upwards through discharge pipe 88. The height or back pressure of the discharge pipe 88 determines the liquid level within cylinder 10. The feed-discharge fittings are equipped with deep packing, at slip fitting 85, which permits slip between pipes 92 and 94, and annular boxes 84 and 86 without significant amount of leakage.

At the opposite end from the feed-discharge mechanism, is the gas injection and venting mechanism. While it is generally similar to the feed mechanism, the size of the pipes involved can be considerably smaller. The present invention contemplates both a gas-feed pipe 100 which may be connected to a high pressure water source 104 and a high or low pressure gas source 102. The high or low pressure gas source would ordinarily be used to inject air or gas to selected areas during the operation of the digester, while the high pressure water source would be used during maintenance clearing operations. The gas is fed through suitable valve means 103 to feed pipe 100 which is connected to pipe 106 within plenum 124. Plenum 124 is attached to plenum 122 which is fitted to slip joint 125 where it meets end plate 32 and is in slipping engagement with end piece 24. Pipe 106 is coupled to pipe 108 with slip joint 125. Pipe 108 runs through end plate 32 to the central cylindrical opening 40 and is connected to a suitable fitting such as six way cross 140. Connected to cross 140 is a gas distribution header 142 which runs the length of the central cylindrical opening 40 and is adapted to distribute air or other gases throughout the length thereof. Cross connections, such as cross 140, may be spaced at intervals throughout the length of cylinder 12.

In addition to the main gas supply header 142 in cylindrical opening 40, the gas distribution system may include transverse gas distribution headers 144 which are connected to the main header 142. The transverse air distribution headers at this location provide a convenient means of aerating the initial feed to the digester.

Also connected to cross 140 are pipes 145, which radiate outwardly, through suitable valve means, 148 to fittings 150 and 151 (and two similar fittings, not shown) to gas distribution headers 153, 154, 155, and 156 which run the length of tapered cylinder member 26 and provide gas to the innermost annular opening 50. This gas distribution system is shown as pipe 153 and pipe 154 in FIG. 1, but is more clearly shown in FIG. 2. The invention contemplates a plurality of gas distribution headers within each annular chamber, but it is preferred that four gas distribution headers, separated by approximately 90°, be used in the innermost annular chambers.

The gas distribution system for the second annular opening 60 is connected to an extension of pipes 145 by fittings 160 and 162 (and two similar fittings not shown) which in turn are connected to gas distribution headers 163, 164, 165, and 166. The gas distribution system for annular opening 60 is basically the same as the gas distribution system shown for annular opening 50. Similarily for annular opening 60, it is preferred to use four gas distribution manifolds, located approximately 90° apart.

The air or gas exhaust means is shown as pipe 120, which is equipped with a bubble cap 121. Because of its location with respect to slip joint 125, exhaust pipe 120 does not rotate with the digester, but remains in a vertical position. Air which is in the uppermost portion of annular opening 70 exhausts through exhaust port 72 and under bubble cap 121 to pipe 120. Pipe 120 leads to plenum 108, into plenum 124 and then out pipe 126. The gas exhaust from pipe 126 may be subjected to constant or intermittent chemical analysis as a means of control of the operation of the digestor. Such a monitoring can be helpful in maintaining optimum metabolic conditions within the digester.

Although the gas distribution systems for the various annular openings may conveniently be of the same general construction, it is preferred that the gas introduced to the central tapered cylinder opening be greatest in volume, while the successive annular openings may receive progressively, less gas. For instance, if the central tapered cylinder opening 40 receives one volume of gas, it is contemplated that annular opening 50 may receive ½ volume, annular opening 60 may receive ¼ volume and so on.

It is preferred that all of the annular openings, except the outermost annular opening, be provided with gas distribution means such as those described above. The number of such gas distribution systems will vary according to the number of tapered cylinder members sued within the horizontal cylinder. The present invention also contemplates digesters in which none or just a few of the inner annular openings are equipped with gas distribution systems.

It will be obvious to those skilled in the art that the gas distribution system can be used to control the temperature at which the digester operates. For instance, heated gas may be used if it is necessary to increase the operating temperature of the digester, while refrigerated gas can be used in case it is desired to lower the temperature of the digester. Appropriately located theremocouples can provide convenient sensing of the temperatures throughout the digester.

Preferably the various chambers within the digester are fitted with agitator means. Agitators for central cylindrical opening 40 are shown as baffles or agitator blades 44. Conveniently these may be welded to gas distribution header 142 or may be affixed to the inner wall of tapered cylinder member 26. The agitator blades for the annular openings may take the form of baffles or agitator blades 54 which may be affixed to the outer wall of tapered cylinder member 26. These blades 54 may also serve as spacers for tapered cylinder members 26, 28 and 30. As the digester is rotated, these blades 44 and 54 which are fixed to the digester structure serve to agitate the material being treated. As is described below, the baffles or agitator blades may also serve as diffusers for the introduction of gas to the respective digestion chambers.

It is preferred that cylindrical members 26, 28, and 30 be tapered in the direction of liquid flow. Thus the inner cylinders are actually truncated cones rather than true cylinders, but are herein referred to as tapered cylinder members. It has been found that a taper improves the flow of both liquid and gas. It is contemplated that a taper of 1 inch per 50 feet is adequate.

It is preferred that the inner cylindrical opening and the several annular openings surrounding the central cylindrical opening be approximately equal in cross-sectional area. This will provide approximately equal flow rates for the material moving through the digester in all parts of the system. As was mentioned above, it is preferred that the inner tapered cylinder members be somewhat tapered, and therefore the cross-sectional area of the various annular openings will vary somewhat, but it is nevertheless desired to have them approximately equal.

Drive means 16 may be a duplex variable speed motor and transmission assembly which will permit the digester to be driven either clockwise or counter-clockwise at variable speeds. Generally in the operation of the digester it is preferred to drive the digester in a clockwise direction, as viewed from FIG. 2.

Discharge pipe 88, which is shown as a simple pipe in FIG. 1 may be used to control the liquid level in the digester. If feeds of varying consistency are to be treated, pipe 88 may be equipped with means to adjust the hydrostatic head, and thereby adjust the liquid level in the digester. In order to take maximum advantage of the full volume of the digester, it is generally preferred that pipe 88 have an elevation approximately as is shown in FIG. 1.

The present invention contemplates various forms and modifications to the gas distribution systems. For instance pipes 145 may be equipped with float valves which will permit the gas to flow only when the gas distribution heads are below the level of the liquids or only during the lower portion of their rotation. In addition to using conventional gas distribution headers, such as the pipes with holes drilled therein illustrated in the drawings, one may use permeable or porous diffusers made of metal powders, cloth, fabric, paper, plastic, glass or other similar materials. Diffusers made from powdered metals are preferred since they can be constructed in a manner so that the bubble sizes of the gases introduced into the digester are closely regulated. Such diffusers may also be used in place of bubble cap 121. Alternatively, one may use tubing or pipe diffusers spirally placed on the inner or outer surface of the tapered cylinder members. Such pipes or tubing may be used in connection with powdered metal diffusers or other types of diffusers, described above.

In the operation of the digester of the present invention, the controlled parameters are adjusted to accomplish the most efficient digestion of the feed materials. For instance when the feed sewage is high in solids content the speed of rotation of the digester may be altered to give the feed a higher retention time. Similarly when the feed is diluted, the retention time can be altered. The retention time can also be controlled by the rate at which raw sewage is introduced. Metering devices, in connection with the feed flow rate will give an accurate mode of regulating the retention time and keeping track of the digestion operation. Temperature may be adjusted by controlling the in feed temperature, the gas temperature, by the use of a water jacket (not illustrated), or other heat exchanger devices.

It is contemplated that the retention time will vary between a few hours and a few days depending upon the nature of the sewage, and other factors which will be known to those skilled in the art.

The digester of the present invention may be used to replace conventional digestion tanks in existing sewage treatment plants or used in new installations. It will usually be employed with the conventional auxiliary equipment and processes. For instance, chemical feed systems which are necessary to condense the material to be digested or which are used to precipitate the recovery of substances of value may be added before or after digestion. Acidity and alkalinity control systems may be used and may include the monitoring of pH within the digester. The usual grinding, pulverizing and shredding machines which are conventionally used to break up paper and paper products and other solid materials found in sewage may be used on the feed before it is introduced into the digester. Separator systems which are used to remove paper fibers or fats and oils and other materials such as centrifing-type separators, floatation tanks, screens, filters, electrostatic systems, precipitation systems, evaporation systems, and others may be used before or after passing the material through the digester. Conventional reservoirs or holding tanks are advisedly employed in order to provide the digester with a constant feed. Additional reservoirs or tanks may be used if by-products are to be recovered. Recycle systems, wherein the bacterial cell masses are separated from the water and recycled through the digester, may also be used. For instance end plate 34 may be provided with a means to recycle a portion of the treated material back into the central cylindrical opening 40 along with the raw feed coming in feed pipe 94.

As will be obvious to those skilled in the art, it is desirable to equip the digester with manholes which permit access to the interior thereof for purposes of maintenance and adjustment. As was mentioned above, end pieces 22 and 24 may be removable, in whole or in part, to facilitate servicing the digester.

The digester may be constructed from any convenient material but generally stainless steel or other non-oxidizing ferrous based metals are preferred.

The forms of invention herein shown and described are to be considered only as illustrative. It will be apparent to those skilled in the art that numerous modifications may be made therein without departure from the spirit of the invention or the scope of the appended claims.

I claim:

1. A horizontal, rotating, continuous-feed digester which comprises
   a horizontal cylinder;
   end members for said horizontal cylinder forming a liquid tight seal with said cylinder;
   rotating means adapted to rotate said horizontal cylinder about its axis;
   a plurality of tapered cylinder members mounted within said horizontal cylinder, concentric thereto, whereby there is defined a central cylindrical opening and a plurality of annular openings surrounding said central cylindrical opening, said tapered cylinder members adapted to be rotated with said horizontal cylinder;
   end members for said tapered cylinder members; and
   said central cylindrical opening having one end in fluid communication with the adjacent annular opening, and each of said annular openings being in fluid communication with the adjacent annular opening, at alternating ends, thereby defining a liquid flow path through the length of said central cylindrical opening and then back and forth through each of the successive annular openings.

2. A digester as described in claim 1, which comprises axial feed means adapted to introduce feed into one end of said central cylindrical opening.

3. A digester as described in claim 1 which comprises gas distribution means within said horizontal cylinder.

4. A digester as described in claim 3, wherein said digester includes axial gas supply means adapted to supply gas to said gas distribution means.

5. A digester as described in claim 3, wherein a plurality of gas distribution means are longitudinally disposed parallel to the axis of said horizontal cylinder, along different radii within said digester.

6. A digester as described in claim 3, wherein gas distribution means are disposed within said central cylindrical opening and at least one annular opening.

7. A digester as described in claim 6, wherein said gas distribution means comprise porous diffusers.

8. A digester as described in claim 1, which is comprised of an odd number of tapered cylinder members within said horizontal cylinder.

9. A digester as described in claim 8, which comprises three tapered cylinder members within said horizontal cylinder.

10. A digester as described in claim 3, wherein a plurality of gas distribution means are longitudinally disposed, parallel to the axis of the horizontal cylinder, along different radii within the digester.

11. A digester as described in claim 10, wherein said gas distribution means comprise porous diffusers.

* * * * *